July 16, 1963

A. F. BLEIWEISS ET AL 3,098,139

CURRENT OPERATED FLASHER WITH VOLTAGE AND
TEMPERATURE COMPENSATION

Filed July 27, 1961

INVENTORS
Arthur F. Bleiweiss
George Colombo
John B. Dickson
BY           Boris Orlov Blum, Moscovitz,
Friedman & Blum

ATTORNEYS

July 16, 1963

A. F. BLEIWEISS ET AL 3,098,139

CURRENT OPERATED FLASHER WITH VOLTAGE AND
TEMPERATURE COMPENSATION

Filed July 27, 1961

INVENTORS
Arthur F. Bleiweiss
George Colombo
John B. Dickson
Boris Orlov

BY Blum, Moscovitz,
Friedman & Blum

ATTORNEYS

United States Patent Office 3,098,139
Patented July 16, 1963

3,098,139
CURRENT OPERATED FLASHER WITH VOLTAGE AND TEMPERATURE COMPENSATION
Arthur F. Bleiweiss, Great Neck, George Colombo, East Rockaway, John B. Dickson, Kew Gardens, and Boris Orlov, Richmond Hill, N.Y., assignors to Signal-Stat Corporation, Brooklyn, N.Y., a corporation of New York
Filed July 27, 1961, Ser. No. 127,167
23 Claims. (Cl. 200—122)

This invention relates to thermomotive flashers or circuit breakers and, more particularly, to such a flasher or circuit breaker incorporating novel voltage and ambient temperature compensating means effective to modulate the circuit constants of the flasher or circuit breaker in accordance with changes in operating voltage or ambient temperature or both.

Flashers and automatic circuit breakers are commonly used in automotive vehicles for flashing signalling lamps, such as turn signal lamps, flare lamps, and the like. The flashers so used in automotive applications generally are thermomotive flashers of either the series, or current-operated, type, or the shunt, or voltage-operated, type. While thermomotive actuated automotive vehicle flashers are simpler and much less expensive than other types of flashers, such as, for example, motor driven commutators, they have the disadvantage of being very sensitive to changes in operating voltage and ambient temperature, these changes affecting the cycling rates of the flashers, and sometimes the on-off time ratios thereof.

As will be appreciated by those skilled in the art, voltage fluctuations are characteristic of the electrical systems of automotive vehicles, which generally comprise a battery and a generator connected in parallel, with the voltage varying within limits even though voltage regulation is employed with the generator. For example, a nominal twelve-volt automotive vehicle electrical system may vary from eleven volts to about fifteen volts. This is a substantial percentage variation in the nominal voltage supply, and results in a correspondingly very substantial change in the operating characteristics of thermomotive flashers.

Part of the reason for the variation in performance of thermomotive flashers with variations in ambient temperature and operating voltage is the fact that the operating element of a thermomotive flasher is an electrically conductive element having an electrical resistance such that the load current is capable of elevating its temperature by a substantial amount. As a result of such elevation in its temperature, the element will expand in accordance with its temperature coefficient of expansion.

In the case of the aforementioned voltage or shunt type flasher, the operating element is connected in parallel with the load circuit controlling contacts of the flasher, and the latter are normally open. Thus, when the circuit is energized, the load current will flow entirely through the operating element and the resistance drop across the operating element is such that there is an insufficient voltage drop across the usual incandescent signal lamps to effectively illuminate the latter. As the operating element is heated to a point where it has expanded by a predetermined amount, the contacts are snapped closed, effectively shorting the operating element and allowing substantially the full applied voltage to be effective upon the signal lamps which thereupon become effectively illuminated. During this period, the shorted operating element cools and contracts and, after a predetermined contraction, snaps open the flasher load carrying contacts, and the cycle repeats.

In the aforementioned series type flasher, the operating element is connected in series with the flasher load carrying contacts, and these contacts are normally closed. When the signalling circuit is energized, the load current flows across the contacts and through the operating element and the signal lamps. In this case, the overall resistance of the operating element is made very substantially less than that of the operating element of a shunt type flasher, so that the effective voltage drop across the signal lamps is sufficient to effectively illuminate the latter. As the operating element heats and expands, it eventually snaps open the load circuit contacts so that the circuit is opened and the signal lamps become extinguished. The operating element thereupon cools and contracts, and after a predetermined contraction, re-closes the load carrying contacts of the flasher to again complete the circuit.

Thus, the operating element of either a shunt type flasher or a series type flasher is subjected, during its heating, to at least part of the potential applied across the circuit in which the flasher is connected, so that the part of the voltage drop across the operating element will vary with the applied voltage. As a result, the rate of expansion of the operating element will also vary with the applied voltage. Additionally, the rate of expansion and contraction of the operating element will also vary with ambient temperature.

The foregoing will be clear when it is considered that, if the ambient temperature remains constant, the heating energy W required to expand the operating element a pre-set amount, and which is a constant with constant ambient temperature, is equal to the product of the voltage drop E across the operating element, current I therethrough and time T, or, expressed as an equation:

$$W = EIT$$

As the factor W remains constant, the time T will vary inversely with any variation in either E or I with the other of these latter two factors remaining constant.

Under standards set by the Society of Automotive Engineers (SAE), the voltage drop across automotive flashers, for example, of the series type, is held to 0.4 volt. As the major part of the voltage drop across a flasher occurs in the operating element thereof, it may be safely assumed that the voltage drop across the operating element would be of approximately 0.3 volt, due to the resistance of this element. However, even if the operating element is not subjected to the full applied voltage, but only to a small fraction thereof, the percentage change in the voltage drop across the operating element will be substantially equal to the percentage change in the applied voltage.

The signal lamps used are incandescent lamps, and the filaments of these lamps have a very high temperature coefficient of resistance. As a result of this, while the resistance of the signal lamps varies substantially with the current flow therethrough, the resistance across the flasher is substantially stable for all practical purposes. However, both the voltage drop across the flasher and the current flow through the flasher vary with the applied voltage and, with W remaining constant, the operating time T will vary inversely with applied voltage. This means that the cycling rate of the flasher increases with the operating voltage, and vice versa.

On the other hand, if the voltage remains constant but the ambient temperature increases, the electrical energy input required to expand the operating element such preset amount will be decreased by the increment of heat input due to the increased ambient temperature. Consequently, the heating time T will be correspondingly decreased and the cycling rate will be increased. Stated another way, the required electrical energy input W varies inversely with the ambient temperature, so that, with E and I remaining constant, T decreases and the cycling rate increases.

To obviate or at least to ameliorate the tendency of the operating constants of thermomotive flashers to vary with variations of ambient temperature and variations of applied voltage, the present invention provides that at least one of the factors determining the operating characteristics of thermomotive flashers is modulated in accordance with variations in the voltage drop across the flasher and changes in ambient temperature, such modulation being effected by a two-step shunting of at least a portion of the operating element to by-pass at least a part of the current therearound. In the first step, a shunt circuit having a resistance of a preselected value is connected across at least a portion of the operating element at a first preselected value of operating voltage. At a second and higher preselected value of operating voltage, a shunt circuit having a resistance of a substantially lower value than in the first step is connected across such portion of the operating element.

By so shunting at least a portion of the high resistance operating element, in accordance with an increase in the value of the operating voltage, the operating element will act as though a voltage of a lower value were effective thereacross and, with proper selection of circuit constants, the operating rate or cycling time, and the ratio of on-time to cycle time, of the flasher can be maintained substantially constant. For example, if the nominal operating voltage of the system is twelve volts, the first shunting of the operating element can be made to take place between twelve volts and thirteen volts so that the normal tendency to increase the cycling rate with an increase in voltage is counteracted by virtue of the fact that a part of the current which normally would flow through the operating element is shunted so that the actual current through the operating element is reduced to a value lower than would otherwise correspond to the increased value of the operating voltage. As the voltage across the flasher increases to a substantially higher value, such as between fourteen and fifteen volts, a further shunting action is provided in which a shunting circuit having a resistance of a still smaller value is connected across the portion of the operating element so that an even greater proportion of the current which normally would flow through the operating element at such higher operating voltage is by-passed therearound. Thereby the operating element "sees" a current of a value corresponding to a lower operating voltage, such as the nominal twelve volts, for example.

More particularly, the modulating means of the present invention includes a thermomotive actuated member having a fixed end electrically connected to one end of the operating element and a deflectable free end. This deflectable free end is arranged, upon an increase in operating voltage to a preselected value, to engage and contact the free end of a relatively elongated resilient resistance member having a fixed end in electric circuit connection with the load circuit controlling contacts of the flasher in parallel with the operating element. The thermomotive member is provided with an electric heater in shunt or parallel with the load circuit controlling contacts of the flasher, and thus subjected to the full circuit or operating potential when these contacts are open. The deflection of the thermomotive actuated member is accordingly proportional to substantially the full circuit potential, so that the degree of shunting of the operating element is, for all practical purposes, also proportional to substantially the full circuit potential.

The parts are so constructed and arranged that, at or below some pre-selected minimum operating voltage such as thirteen volts, for example, the movable or free end of the thermomotive member is disengaged from the movable free end of the resistance member. At a voltage of, for example, thirteen volts, the thermomotive member has deflected sufficiently to engage its free end with the free end of the resistance member. This establishes a current carrying shunt circuit around at least a portion of the operating element of the circuit breaker, this shunt circuit electrically including, in series, the resistance of the electrically conductive thermomotive member and the resistance of the resistance member. If the operating voltage still increases, the thermomotive member deflects to a greater extent and moves the free end of the resistance member toward such one end of the operating element of the flasher. At a preselected maximum voltage, this deflection of the thermomotive member is sufficient to engage the free end of the resistance element electrically with such one end of the operating element. This, in effect, shorts out the resistance of the thermomotive member so that there is now only the resistance of the resistance member in shunt with the portion of the operating element of the flasher. Consequently, an even greater proportion of the current is diverted to flow through this shunt circuit and thus to by-pass the operating element of the flasher. The limits of operation may be pre-set accurately by proper selection of the initial positioning and orientation of the component parts.

It will be appreciated that the thermomotive actuated member is also responsive to ambient temperature so that any shunting of the operating element is a result not only of the circuit voltage but also of the ambient temperature effective on the thermomotive actuation of the shunting means.

The invention is applicable to any type of thermomotive flasher involving an electrical heating responsive expansible operating element which effects opening and closing of the contacts. However, it is more particularly effective when applied to a thermomotive flasher of the type incorporating a snap action vane and pull element, such as shown, for example, in Welsh U.S. Patent 2,756,304, issued July 24, 1956. As applied to this type of thermomotive flasher, the shunt or by-pass circuit forming means is utilized to shunt a portion of the pull element which constitutes the heat expansible operating element for this type of flasher. To provide a specific example of the application of the principles of the invention, the invention will therefore be described as applied to this particular type of thermomotive flasher, although it will be understood that the principles of the invention are not limited thereto but are applicable to any type of thermomotive flasher involving an electrically conductive heat expansible operating element.

For an understanding of the principles of the invention, reference is made to the following description of a typical embodiment thereof as illustrated in the accompanying drawings. In the drawings.

Figure 1:
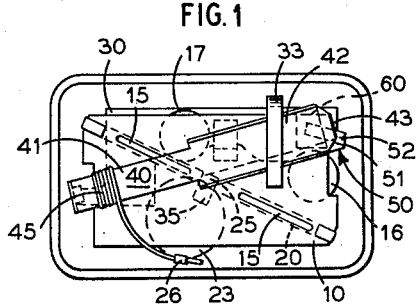
FIG. 1 is a plan view of a thermomotive flasher embodying the invention, with the casing removed.

Referring to FIGS. 1 through 4, the principal operating components of the flasher are a snap action, preferably electrically conductive, metal vane 10 to which is attached a pull ribbon 20 of electrically conductive thermally expansible metal whose resistance is such that the load current is capable of elevating its temperature by a substantial amount. As set forth in said Welsh patent, vane 10 is formed with linearly extending aligned and spaced preset deformations 15 extending diagonally thereacross, providing an initial bending line about which the vane is bent in its "restored" position. At the ends of this diagonal, the corners 11 of the vane are bent out of the general plane of the vane and the opposite ends of pull ribbon 20 are permanently secured thereto as by welding, soldering, brazing, or the like. Pull ribbon 20 is secured to vane 10 in the cold contracted condition of the pull ribbon and while the vane is bent about another bend line extending at an angle to the deformations 15 so that the vane, with the pull ribbon 20 attached thereto, is bent about this other line in a "stress-deformed" condition. The bending of vane 10 to the "stress-deformed" condition stores potential energy in the vane so that the latter tends always to snap back to the "restored" condition as soon as the tension, holding it in the "stress-deformed" condition, is released.

As the temperature of the pull ribbon increases due to the flow of electric current therethrough, the pull ribbon expands and, after a predetermined expansion of the pull ribbon, the potential energy in the vane 10 overcomes the holding force of the pull ribbon and the vane 10 snaps to its restored position in which it is bent about the deformations 15—15. As the pull ribbon 20 cools and contracts, it snaps the vane 10 back to the "stress-deformed" condition in which it is bent about a line extending at an angle to the line of deformation 15—15.

As further explained in said Welsh patent, when vane 10 is fixedly supported at a zone or point spaced laterally of the bend line 15—15, a movable portion of the vane will have a relatively high amplitude of movement when the vane is alternately snapped between its "restored" and "stress-deformed" positions.

The flasher operating elements are supported upon a dielectric base 12, which, in the form illustrated, is substantially rectangular with rounded corners and has a ledge 13 extending therearound. This ledge 13 serves to seat a metal casing 14 for the flasher parts. A conductive metal plate 30 is supported on the upper surface of the base 12 and is anchored thereto by the rivets 16 and 17. Rivet 16 also anchors a male prong 18 to the base and electrically connects this prong to the plate 30. A first arm 31 is bent upwardly from an edge of plate 30 and then outwardly, the outwardly extending portion of this arm 31 being welded, brazed, riveted, soldered, or otherwise anchored to vane 10 at a point substantially laterally of the line of deformation 15—15. This point of anchoring of vane 10 to arm 31 forms the fixed mounting for the vane about which the major part of the vane pivots during its snapping section. For a purpose to be described, a second arm 32 extends outwardly from one end of the plate 30 and is then bent upwardly. A third arm 33 is bent upwardly from an outer edge of plate 30 and then preferably inwardly parallel to the plate. The purpose of arms 32 and 33 will be described hereinafter.

A second prong 21 extends from base 12 and is anchored to the base by means of a post 22 having its bottom end riveted over a bent portion of the prong 21 and its upper end enlarged, as at 23, and disposed a substantial distance above the upper surface of metal plate 30. The post 22 is physically separate and spaced from the plate 30, and is consequently electrically isolated therefrom. The upper surface of the enlarged head 23 is very close to the pull ribbon 20, which carries a centrally positioned contact 25 which cooperates with a fixed contact 35 on the upper end of the head 23.

The contacts 25 and 35 are in engagement when no potential is impressed across the terminals 18 and 21. In the usual manner of using a flasher of this type, the latter is plugged into a suitable receptacle connected in series with a signalling circuit, or is otherwise connected in series in a signalling circuit. For example, the receptacle may be connected in series with a turn signalling switch and the turn signalling lamps of a vehicle. In such a case, when the turn signal switch is closed in either direction, the current will flow from prong 21 into post 22 and thus through contacts 35 and 25 into pull ribbon 20. The current divides in pull ribbon 20 so that one-half flows through each end of the pull ribbon and thus into the vane 10. From the vane 10, the current flows through the support arm 31 and thus into the metal plate 30 connected electrically to the prong 18.

The current flow through the pull ribbon 20 will heat the latter so that it will expand. After a pre-set expansion of pull ribbon 20, the vane 10 will snap to its "restored" position, pivoting about its connection with the post or arm 31. The portion of the vane to which the pull ribbon 20 is attached will have a substantial amplitude of movement away from the post 22, so that the contacts 25 and 35 will be snapped apart to open the load circuit. As the current flow through the pull ribbon is thereupon interrupted, the latter will cool and contract. After a predetermined contraction, the pull ribbon will snap the vane from its "restored" condition to its "stress-deformed" condition, effecting snap re-engagement of the contacts 25 and 35. This re-establishes the load circuit through the flasher across the contacts 25 and 35, so that pull ribbon 20 is again heated by current flow therethrough. This cyclic action continues as long as a potential is applied across the prongs 18 and 21.

Except for the provision of the plate 30, and particularly the arms 32 and 33 thereof, the flasher as so far described is conventional and will operate in the conventional manner characteristic of thermomotive flashers and particularly of such flashers as described in said Welsh patent. Thus, the cycling rate of the flasher will vary with changes in the potential drop across the prongs 18 and 21 (nominally 0.4 volt) and also with changes in ambient temperature. For example, if the voltage drop across prongs 18 and 21 decreases, it will take a longer time for the pull ribbon 20 to heat and expand sufficiently to allow the vane 10 to snap open the contacts 25 and 35, and conversely if the voltage drop across prongs 18 and 21 increases. This, in turn, will either increase, in the one case, or decrease, in the other case, the "on" time of the flasher. If the ambient temperature is relatively high, the cooling time of the pull ribbon 20 will be increased, and its heating time will be decreased, thus involving a further change in the cycling rate of the flasher as well as the ratio of on-time to cycle time. On the other hand, if the ambient temperature is relatively low, the cooling time will be decreased and the heating time will be increased. As will now be explained, the flasher embodying the present invention is provided with means for automatically shunting or by-passing a part of the current flowing through pull ribbon 20, through shunt or by-pass circuits having resistance values varied in accordance with the value of the applied operating potential, so as to maintain the cycling rate and the ratio of on-time to cycle time substantially constant irrespective of variations in potential and in ambient temperature.

A thermomotive arm 40, which is preferably a bi-metallic arm, has a relatively narrow inner portion 41 fixedly secured at its end to the upright post 32. The outer or free portion 42 of arm 40 is somewhat longer than the narrower inner portion and has a channel shape, or other formation, so as to provide increased rigidity to the outer portion 42. Arm 40 extends substantially completely across the vane 10 so that the outer end thereof is adjacent the far edge of the vane 10. A heating winding 45 is wrapped on the bimetal arm 40 as near as possible to the fixed connection thereof with the post 32, so as to obtain maximum deflection of the outer end of the arm 40 with a given heat input. One end of winding 45 is secured to an electrically conductive and preferably flexible strip of metal 26 which has its opposite end in electrical and mechanical contact with the post 22. The other end of heating winding 45 is electrically and mechanically connected to the bimetal arm 40, which is also electrically conductive. Thereby, the heating winding 45 is effectively connected in shunt with the load contacts 25 and 35, as will be particularly apparent from the schematic wiring diagram shown in FIG. 8. The extreme outer end of arm 40 is bent up in a rounded fashion as shown at 43, for a purpose to be described.

Figure 2:
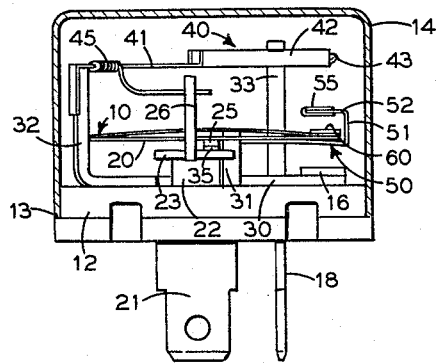
FIG. 2 is a left hand side elevational view of the flasher shown in FIG. 1, the casing being shown in section.
Figure 4:
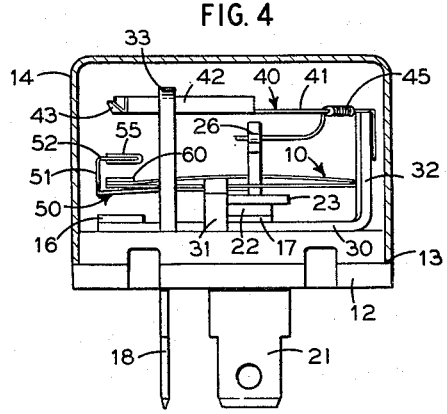
FIG. 4 is a right hand side elevational view of the flasher shown in FIG. 1, with the casing shown in section.
Figure 5:
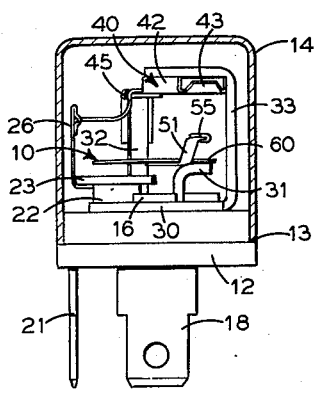
FIG. 5 is a plan view of the sub-assembly of the snap action vane, the pull ribbon, and the resistance element.
Figure 3:
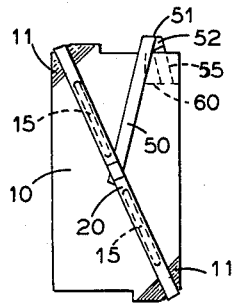
FIG. 3 is an end elevational view of the flasher shown in FIG. 1, the casing being again shown in section.

As best seen in FIGS. 2, 4 and 5, a strip 50 of relatively high electrical resistance material, such as "Nichrome," has one end welded or brazed to the pull ribbon 20 adjacent the contact 25, preferably on the opposite surface of the pull ribbon from such contact. Strip 50 extends outwardly beneath, but out of contact with, the vane 10, is then bent upwardly in a twisted fashion as indicated at 51, and then bent inwardly over the vane in spaced relation thereto as indicated at 52. This strip is flexible and resilient, and a contact strip 55 embraces the free end 52 of the strip 50. End 52 and contact strip 55 are substantially in vertical alignment with the bent end 43 of the bimetal arm 40, and thus in the path of movement thereof. Furthermore, vane 10 has a contact 60 welded or brazed thereto in vertical alignment with the end 52 and contact strip 55, and thus also in the path of movement of bent end 43 of member 40.

The operation of the invention will be understood best by reference to FIGS. 2, 6, 7 and 8. In the schematic wiring diagram of FIG. 8, a source of operating potential is indicated at "Battery," this battery having one terminal grounded and the other terminal connected to the flasher. The battery represents the usual automotive source of electric power such as, for example, a 12-volt battery-generator system. Contact 35 is illustrated as connected through a switch SW to one terminal of a lamp SL, the other terminal of which is grounded. For a better understanding of the electrical theory involved, the bimetal arm 40 is illustrated as including a resistance 40A, and the strip 50 is illustrated as including a resistance 50A. Also, the two halves of the pull ribbon 20 are illustrated as resistances 20A and 20B.

Figure 6:
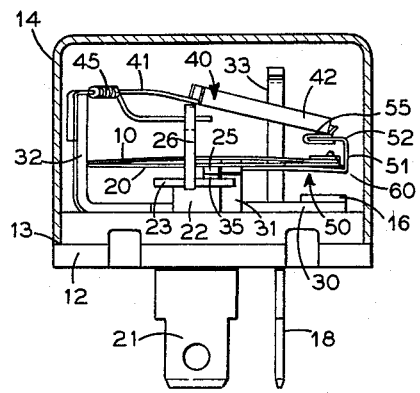
FIGS. 6 and 7 are views similar to FIG. 2 but respectively illustrating the position of the shunting elements in each of the two respective shunting positions.
Figure 8:
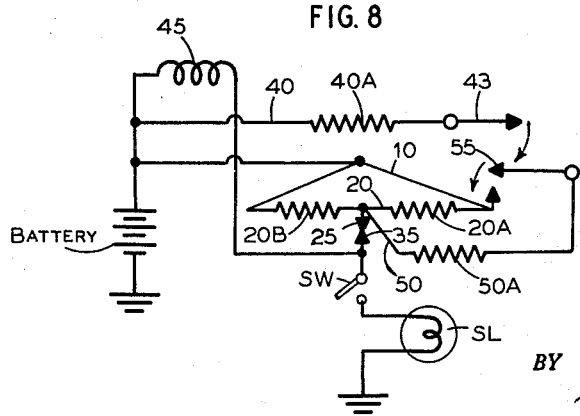
FIG. 8 is a schematic wiring diagram illustrating the principles of the invention.

At or below the nominal operating potential of approximately twelve volts, the parts occupy the positions shown in FIGS. 2 and 8. When the switch SW is closed, a current flows through the flasher and the latter snaps between open and closed positions in the manner previously described, so as to separate and re-engage contacts 25 and 35 in a cyclic manner. If the operating potential should increase above the nominal value, the bimetal arm 40, which is normally engaged with the arm 33, and thus restrained at a pre-set distance above the contact 55, will begin to deflect due to the heating provided by the winding 45, which is subjected to substantially the full circuit or operating potential when the load circuit controlling contacts 25 and 35 are separated. Between twelve and thirteen volts, the deflection of arm 40 will be sufficient to engage its end 43 with the contact 55 carried by the resistance strip 50, as shown in FIG. 6. This will close a series circuit comprising the resistance 40A and 50A, across or in parallel with the parallel resistances 20A and 20B of the pull ribbon 20. Consequently, a shunt or by-pass path is provided for the currents normally flowing through the two halves of the pull ribbon, and the reduced current flow through the latter, will decrease the cycling rate from that appurtenant to a thirteen-volt operating potential to a value more nearly appurtenant to a twelve-volt operating potential.

Figure 7:
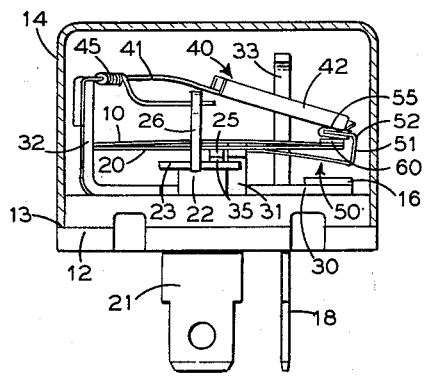

Should the operating potential continue to increase, the arm 40 will deflect even further and engage the contact 55 with greater pressure, deflecting the resistance member 50 downwardly relative to vane 10. The increasing contact pressure results in increasing the current flow through the shunt circuit thus further retarding the heating of the pull ribbon and decreasing the cycling rate and the ratio of on-time to cycle time. At a potential value of between fourteen and fifteen volts, for example, the contact 55 will be engaged with the contact 60 carried by the vane 10, as best seen in FIG. 7, and correspondingly the resistance 40A is now shorted and only the resistance 50A is included in the current shunt or by-pass circuit around the parallel resistances 20A and 20B of the pull ribbon 20. As the voltage further increases, the contact pressure increases with the results described above. In addition, the direct pressure on the vane at contact 60 acts mechanically to decrease the cycling rate of the flasher. Consequently, a greater proportion of the current is deflected through the shunt circuit and a corresponding reduction is effected in the currents flowing through the two halves of the pull ribbon 20. Thereby, the current flow through the pull ribbon is kept at a value corresponding more nearly to the current flow therethrough when the operating potential is at the nominal value of, for example, twelve volts. The cycling rate is thus kept substantially constant over the range from twelve volts to fifteen volts irrespective of the fact that the operating potential has increased.

It will be apparent that the mechanism described also compensates for variations in ambient temperature. Upon an increase in ambient temperature, arm 40 will deflect toward contact 55, so that the voltage increase required to engage arm 40 with contact 55 will be diminished. In other words, the shunting action will begin at a lower voltage, thus compensating for the changes in the cycling rate, and in the ratio of on-time to cycling time, due to the ambient temperature increase. The converse effect takes place upon a decrease in ambient temperature.

It has been found, in practice, that the flashers of the invention maintain the cycling rate of the flasher and the ratio of on-time to cycle time within very small limits irrespective of wide fluctuations in operating voltage and wide variations in ambient temperature.

While a specific embodiment of the invention has been described in detail to illustrate the application of the principles of the invention, it will be understood that the invention may be embodied otherwise without departing from such principles.

What is claimed is:

1. A thermomotive circuit breaker comprising, in combination, a thermomotive electric resistance element; a pair of load circuit controlling contacts in electric circuit connection with said resistance element and closed in one position thereof and open in another position thereof, said contacts controlling flow of heating current through said resistance element; an electrically conductive thermomotive member having a fixed end electrically connected to an end of said resistance element, and a movable free end; a relatively fixed contact electrically connected to such fixed end of said thermomotive member and in the path of movement of said free end of said thermomotive member; a relatively elongated flexible resistance member having a fixed end in electric circuit connection with said load circuit controlling contacts in parallel with said resistance element, said resistance member having a free end in the path of movement of the free end of said thermomotive member and engageable by the latter for movement toward said fixed contact; and an electric heater for said thermomotive member in circuit connection with said load circuit controlling contacts and subjected to any potential drop across the latter; said thermomotive member, when said potential drop exceeds a first preselected value, deflecting to engage its movable free end with the free end of said resistance member for current flow through a circuit in shunt with said resistance element and including said thermomotive member and said resistance member in series; said thermomotive member, when said potential drop exceeds a second and higher preselected value, deflecting said free end of said resistance member to engage said fixed contact to short said thermomotive member for current flow in a circuit in shunt with said resistance element and including said resistance member.

2. A thermomotive circuit breaker as claimed in claim 1, in which said contacts are in series with said resistance element and include a movable contact, movable with said resistance element, and a second relatively fixed contact; the fixed end of said resistance member being electrically connected to said movable contact.

3. A thermomotive circuit breaker as claimed in claim 1, in which said electric heater comprises a high resistance insulated electric conductor wound on said thermomotive member.

4. A thermomotive circuit breaker comprising, in combination, a snap action element normally constrained to assume a pre-set restored position; a relatively elongated heat expansible electric resistance element operatively associated with said snap action element and, in its cold and contracted state, constraining said snap action element snapped to a stress-deformed position, said snap action element snapping to its restored position upon pre-set expansion of said resistance element; a pair of load circuit controlling contacts operatively associated with said snap action element and in electric circuit connection with said resistance element, said contacts being closed in one position of said snap action element and open in the other position of said snap action element, and controlling the flow of heating current through said resistance element; an electrically conductive thermomotive member having a fixed end electrically connected to an end of said resistance element, and a movable free end; a relatively fixed contact electrically connected to such fixed end of said thermomotive member and in the path of movement of said free end of said thermomotive member; a relatively elongated flexible resistance member having a fixed end in electric circuit connection with said load circuit controlling contacts in parallel with said resistance element, said resistance member having a free end in the path of movement of the free end of said thermomotive member and engageable by the latter for movement toward said relatively fixed contact; and an electric heater for said thermomotive member in circuit connection with said load circuit controlling contacts and subjected to any potential drop thereacross; said thermomotive member, when said potential drop exceeds a first preselected value, deflecting to engage its free end with the free end of said resistance member to form a current flow circuit shunting said resistance element and including said thermomotive member and said resistance member in series; said thermomotive member, when said potential drop exceeds a second and higher preselected value, deflecting said free end of said resistance member to engage said relatively fixed contact to short said thermomotive member and to form a current carrying circuit in shunt with said resistance element and including said resistance member.

5. A thermomotive circuit breaker as claimed in claim 4, in which said load circuit controlling contacts are in series circuit relation with said resistance element.

6. A thermomotive circuit breaker as claimed in claim 5, in which said electric heater comprises a high resistance insulated electric conductor wound on said thermomotive member.

7. A thermomotive circuit breaker as claimed in claim 4, in which said end of said resistance element is electrically and mechanically connected to said snap action element, and said resistance element is movable with said snap action element during snapping of the latter; said load circuit controlling contacts comprising a first contact movable with said resistance element and a second relatively fixed contact; said fixed end of said resistance member being electrically connected to said first contact.

8. A thermomotive circuit breaker as claimed in claim 7, in which said load circuit controlling contacts are in series with said resistance element and said snap action element.

9. A thermomotive circuit breaker comprising, in combination, a snap action vane of electrically conductive metal normally constrained to assume a pre-set restored bent position; a relatively elongated heat expansible electric resistance pull element secured at opposite ends to said vane in the cold and contracted state to constrain said vane to be bent to a stress-deformed position, said vane snapping to its restored position upon pre-set expansion of said pull element; means fixedly mounting said vane at a point spaced laterally from said pull element, for movement of the portion of the vane carrying said pull element during snapping of the vane; a pair of load circuit controlling contacts in electric circuit connection with said pull element, and including a first relatively fixed contact and a movable contact carried by one of said elements and movable therewith; said contacts being closed in one position of said vane for flow of heating current through said pull element, and open in the other position of said vane; an electrically conductive thermomotive member having a fixed end electrically connected to said vane, and a movable free end; a second relatively fixed contact electrically and mechanically secured to said vane and in the path of movement of said free end of said thermomotive member; a relatively elongated flexible resistance member having a fixed end in electric circuit connection with said load circuit controlling contacts in parallel with said resistance element, said resistance member having a free end in the path of movement of the free end of said thermomotive member and engageable by the latter for movement toward said second relatively fixed contact; and an electric heater for said thermomotive member in circuit connection with said load circuit controlling contacts and subjected to any potential drop across said contacts; said thermomotive member, when said potential drop exceeds a first preselected value, deflecting to move its free end to engage the free end of said resistance member to establish a current carrying circuit in shunt with said pull element and including said thermomotive member and said resistance member in series; said thermomotive member, when said potential drop exceeds a second and higher preselected value, deflecting said free end of said resistance member to engage said second relatively fixed contact to short said thermomotive member to establish a current carrying circuit in shunt with said pull element and including said resistance member.

10. A thermomotive circuit breaker as claimed in claim 9, in which said movable contact is carried by said pull element at substantially the midpoint of the latter; the fixed end of said resistance member being electrically and mechanically connected to the midpoint of said pull element.

11. A thermomotive circuit breaker as claimed in claim 10, in which said resistance member comprises a strip of electric resistance metal extending from said pull element over a surface of the vane to a point beyond the edge of the vane, then substantially normal to said vane, and then inwardly over the opposite surface of the latter; the free end of said resistance member having a contact engageable by the free end of said thermomotive member and engageable with said second relatively fixed contact.

12. A thermomotive circuit breaker as claimed in claim 9, in which said electric heater comprises a high resistance insulated conductor wound on said thermomotive member and having one end electrically connected to said first fixed contact and the other end electrically connected to said thermomotive member.

13. A thermomotive circuit breaker as claimed in claim 9, including means limiting movement of said thermomotive member away from the free end of said resistance member.

14. A thermomotive circuit breaker as claimed in claim 13, in which said thermomotive member comprises a bimetal arm having a curved bent portion at its free end engageable with said free end of said resistance member for sliding contact therewith.

15. A thermomotive circuit breaker as claimed in claim 1, in which the increasing contact pressure between the free ends of said thermomotive member and said resistance member, during such deflection of the latter, results in increasing current flow in said first-mentioned shunt circuit; and increasing contact pressure between the free end of said resistance member and said fixed contact, due to further increase in said potential drop, results in increasing current flow in said second mentioned shunt circuit.

16. A thermomotive circuit breaker as claimed in claim 9, in which increasing contact pressure between the free end of said resistance member and said second relatively fixed contact decreases the cycling rate of said vane.

17. A thermomotive circuit breaker comprising, in combination, a thermomotive electric resistance element, a pair of load current carrying contacts in electric circuit connection with said resistance element and closed in one position thereof and open in another position thereof, said contacts controlling flow of heating current through said resistance element; an electrically conductive thermomotive member having a fixed end electrically connected to an end of said resistance element, and a movable free end; a resistance member having a first end in electric circuit connection with said load current carrying contacts in parallel with said resistance element, said resistance member having a second end in the path of movement of the free end of said thermomotive member and engageable by the latter; and an electric heater for said thermomotive member in circuit connection with said load current carrying contacts and subjected to any potential drop across the latter; said thermomotive member, when the current flow across said contacts exceeds a pre-selected value, deflecting to engage its movable free end with said second end of said resistance member for current flow through a circuit in shunt with said resistance element and including said resistance member in series.

18. A thermomotive circuit breaker as claimed in claim 17, in which said contacts are in series with said resistance element and include a movable contact, movable with said resistance element, and a second relatively fixed contact; said first end of said resistance member being electrically connected to said movable contact.

19. A thermomotive circuit breaker comprising, in combination, a snap action element normally constrained to assume a pre-set restored position; a relatively elongated heat expansible electric resistance element operatively associated with said snap action element and, in its cold and contracted state, constraining said snap action element snapped to a stress-deformed position, said snap action element snapping to its restored position upon pre-set expansion of said resistance element; a pair of load current carrying contacts operatively associated with said snap action element and in electric circuit connection with said resistance element, said contacts being closed in one position of said snap action element and open in the other position of said snap action element, and controlling the flow of heating current through said resistance element; an electrically conductive thermomotive member having a fixed end electrically connected to an end of said resistance element, and a movable free end; a resistance member having a first end in electric circuit connection with said load current carrying contacts in parallel with said resistance element, said resistance member having a second end in the path of movement of the free end of said thermomotive member and engageable by the latter; and an electric heater for said thermomotive member in circuit connection with said load current carrying contacts and subjected to any potential drop thereacross; said thermomotive member, when the load current exceeds a first pre-selected value, deflecting to engage its free end with said second end of said resistance member to form a current flow circuit shunting said resistance element and including said resistance member in series.

20. A thermomotive circuit breaker as claimed in claim 19 in which said load current carrying contacts are in series circuit relation with said resistance element.

21. A thermomotive circuit breaker as claimed in claim 19, in which said end of said resistance element is electrically and mechanically connected to said snap action element, and said resistance element is movable with said snap action element during snapping of the latter; said current carrying contacts comprising a first contact movable with said resistance element and a second relatively fixed contact; said first end of said resistance member being electrically connected to said first contact.

22. A thermomotive circuit breaker comprising, in combination, a snap action vane of electrically conductive metal normally constrained to assume a pre-set restored bent position; a relatively elongated heat expansible electric resistance pull element secured at opposite ends to said vane in the cold and contracted state to constrain said vane to be bent to a stress-deformed position, said vane snapping to its restored position upon pre-set expansion of said pull element; means fixedly mounting said vane at a point spaced laterally from said pull element, for movement of the portion of the vane carrying said pull element during snapping of the vane; a pair of load current carrying contacts in electric circuit connection with said pull element, and including a first relatively fixed contact and a movable contact carried by one of said elements and movable therewith; said contacts being closed in one position of said vane for flow of heating current through said pull element, and open in the other position of said vane; an electrically conductive thermomotive member having a fixed end electrically connected to said vane, and a movable free end; a relatively elongated resistance member having a first end in electric circuit connection with said load current carrying contacts in parallel with said resistance element, said resistance member having a second end in the path of movement of the free end of said thermomotive member and engageable by the latter; and an electric heater for said thermomotive member in circuit connection with said load current carrying contacts and subjected to any potential drop across said contacts; said thermomotive member, when the load current exceeds a pre-selected value, deflecting to move its free end to engage said second end of said resistance member to establish a current carrying circuit in shunt with said pull element and including said resistance member in series.

23. A thermomotive circuit breaker as claimed in claim 22, in which said movable contact is carried by said pull element at substantially the mid-point of the latter; said first end of said resistance member being electrically and mechanically connected to the mid-point of said pull element.

References Cited in the file of this patent

UNITED STATES PATENTS

| | | |
|---|---|---|
| 2,708,697 | Welsh | May 17, 1955 |
| 2,737,553 | Welsh | Mar. 6, 1956 |